Jan. 19, 1937.  E. A. RUSSELL  2,068,097
LOCK FOR HOSE COUPLERS
Filed April 13, 1936
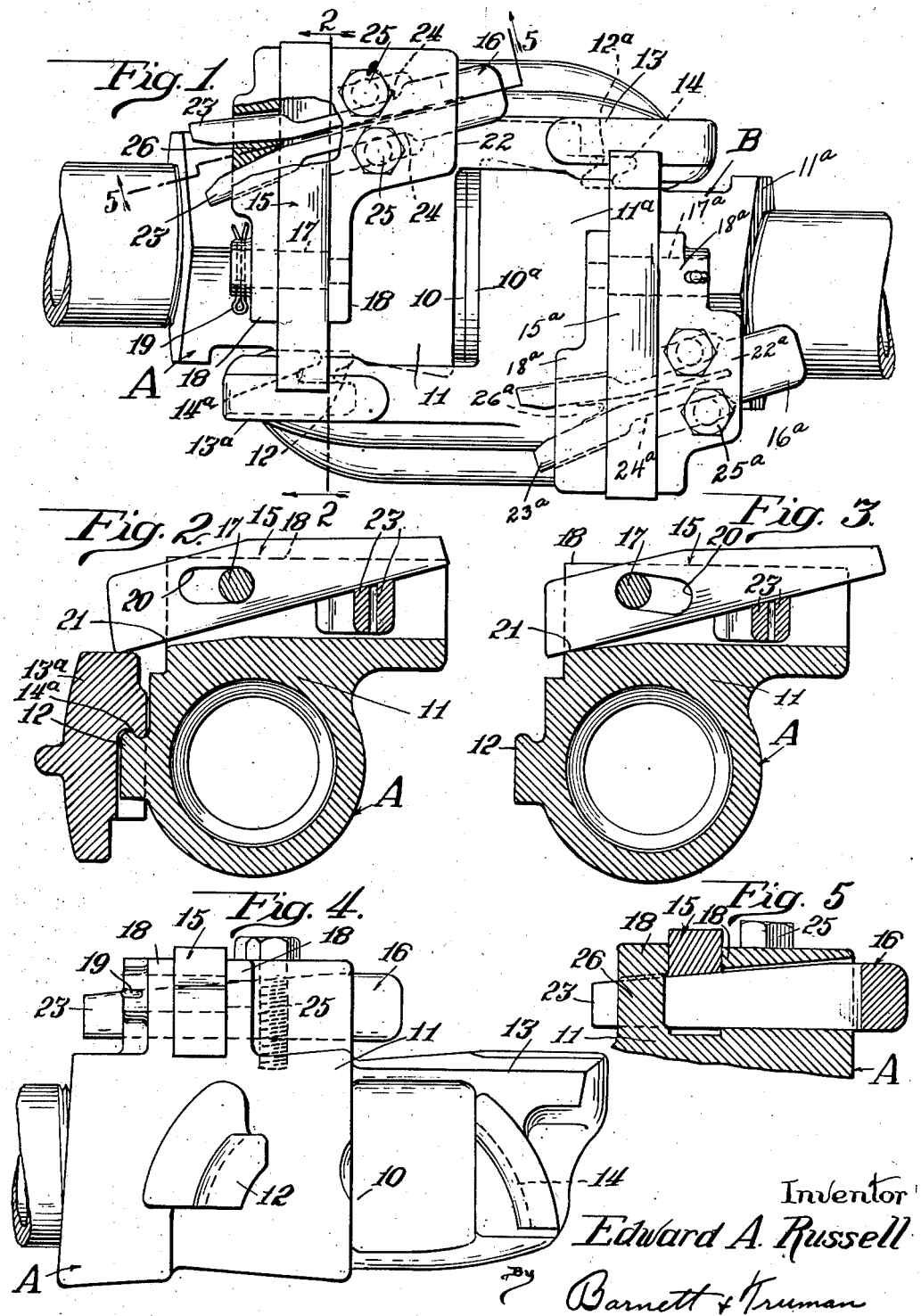
Inventor
Edward A. Russell
By Barnett & Truman
Attorneys Patented Jan. 19, 1937

2,068,097

UNITED STATES PATENT OFFICE 2,068,097

LOCK FOR HOSE COUPLERS

Edward A. Russell, Chicago, Ill., assignor to Vapor Car Heating Company, Inc., Chicago, Ill., a corporation of New York Application April 13, 1936, Serial No. 74,133

8 Claims. (Cl. 285—68)

This invention relates to couplings for connecting together the hoses or other flexible end sections of the train pipes of railway cars; and the object of the invention is to provide new and improved means for locking together the mating coupler members of such coupling so as to prevent accidental disengagement or partial separation.

The locking devices heretofore used for the above purpose have included locking means in the form of sliding wedges or other forms of locking bars adapted to be driven transversely of the mating coupler arm into frictional holding engagement with the upper edge of said arm. The forwardly projecting arms of coupler heads do not always stand at uniform heights with relation to the mating coupler heads. In driving the old forms of locking bars or wedges to positions overlying the arms of mating couplers and thereby force the arms downwardly to their proper positions, the arms are frequently distorted by the pressure exerted laterally on the arms by reason of the transverse movement of the locking members. Such distortion of an arm interferes with its proper locking when it is engaged with another mating coupler. Furthermore the force and the rubbing engagement exerted by such locking devices tend to produce excessive wear of the parts and thereby render the locking devices and/or coupler heads unsuitable for further use.

According to the present invention the locking means include a pivoted lever which is freely movable to a position overlying a mating coupling arm and is tilted into holding engagement with said arm by means of a wedge of novel construction adapted to be driven between one end of the lever and the top of the coupler head. The wedge is preferably a spring cotter, the resilient arms of which are adapted to be flexed laterally into resilient holding engagement with parts of the coupler head so as to retain the key in any desired position independently of its wedging engagement with the pivoted lever.

Various other objects and advantages of the invention will be readily apparent from the detailed description of the specific embodiment shown in the accompanying drawing.

In the drawing:

Fig. 1 is a plan view of a train pipe coupling composed of interlocking couplers, each of which is provided with a locking means made in accordance with this invention.

Fig. 2 is a cross sectional view taken on line 2—2 of Fig. 1 looking in the direction indicated by the arrows, showing the locking means engaged with the forwardly projecting arm of a mating coupler.

Fig. 3 is a cross sectional view similar to Fig. 2, but showing the pivoted lever of the locking means retracted to a position to permit the coupler to be interlocked with a mating coupler.

Fig. 4 is a side view in elevation of the coupler head and forwardly projecting arm shown at the left of Fig. 1, and Fig. 5 is a fragmentary sectional view taken on line 5—5 of Fig. 1.

The hose coupling illustrated in the drawing includes couplers A and B interlocked with each other in a manner to draw the couplers together and thereby insure a fluid-tight connection between the abutting gaskets 10—10a. The coupler A comprises a head member 11 provided at one side with a cam lug 12 and at the other side with a forwardly projecting arm 13. The arm is provided at its outer end portion with an undercut cam lug 14 adapted to fit over and interlock with the grooved portion of a cam lug 12a formed on the mating coupler 11a. The said mating coupler is provided with a similar cam arm 13a for interlocking engagement with the cam lug 12 of the coupler 11. The contour of the cams are such that the interlocking parts are engaged by a downward rocking movement of the arms 13—13a to bring the curved cam surfaces into interlocking engagement with each other.

The couplers A and B are held in their interlocked relation by locking means adapted to press downwardly on the top surfaces of arms of the coupler heads. The locking means of the present invention include a pivoted lever 15 adapted to overlie and engage the top of the mating coupler arm 13a and a one-piece spring wedge adapted to be driven between one end of the lever and the head of the coupler to force the other end of the lever downwardly against the mating coupler arm 13a and thereby force the under-cut cam 14a thereof into tight interlocking engagement with the cam lug 12 of the coupler. The said lever 15 extends transversely of the coupler head A and is pivotally supported thereon to tilt about a horizontal axis, preferably a pin 17 which extends through openings formed in upstanding ribs 18—18 on the coupler head. The pivot pin may be secured in said openings by any suitable means, for example, a cotter pin 19. The pivot pin 17 extends through an elongated opening 20 in the lever, whereby the lever can be moved freely in the direction of its length transversely of the coupler head on which it is supported to a position overlying the top surface of the mating coupler arm 13a (Fig. 2) or it may be retracted to the position indicated in Fig. 3, so as to stand clear of the mating coupler arm during the rocking of the couplers into and out of their interlocking engagement. The elongated opening 20 is preferably inclined lengthwise of the lever so that the lower surface 21 of the lever can be moved into close relation to the top surface of the coupler when the lever is in the retracted position indicated in Fig. 3, thereby making it practicable to move the lever into binding engagement with the top of the coupler head by a relatively slight tilting movement of the lever. When the lever is tilted into engagement with the coupler head, as shown in Fig. 3 of the drawing, the spring wedge 16 may be positioned to hold it in that position, whereby the coupler head may be readily interlocked with a mating coupler without requiring preliminary adjustment of the locking lever.

The wedge member 16 is preferably in the form of a spring cotter positioned to be moved transversely of the pivoted lever 15. The said wedge is guided in a suitable housing 22 formed on the top of the coupler head 11 and is adapted by reason of resilience of its arms 23—23 to exert a resilient grip on portions of the housing, thereby avoiding accidental displacement of the wedge from any position of adjustment. The side walls of the said arms 23—23 are preferably recessed, as indicated at 24, so as to increase the resiliency of the arms. Preferably stop members in the form of bolts 25—25 extend through the top wall of the housing and into the said recesses to provide abutments which limit the forward and reverse movements of the spring wedge. The resilient arms of the wedge are flexed outwardly by means of a V-shaped portion 26 of the housing located in the path of movement of the wedge. The arms of the wedge are therefore under constant tension and bear with sufficient force against the V-shaped portion 26 to retain the wedge in any desired position independently of its wedging engagement with the under surface of the pivoted lever 15. The upper surface of the wedge arms 23—23 are preferably inclined transversely, as shown in Figs. 2 and 3, as well as longitudinally, as shown in Fig. 5, so as to provide relatively flat surfaces for bearing against the locking lever for all tilted positions of the lever.

The locking means shown in connection with coupler 11 includes the arrangement of the spring key whereby it may be driven in a direction toward the conduit on which the head is supported. The spring wedge 16a illustrated in connection with the coupler B shows an arrangement whereby the tilting of the lever 15a to its locking position is effected by moving the spring wedge in a direction away from the conduit on which the coupler head is supported. In other respects, the locking lever and wedge shown on coupler B may be and preferably are the same as the lever and wedge of the coupler A. The various parts of coupler B, therefore, have been given the same reference numerals with the addition of the exponent a.

In operation the locking levers 15—15a are normally held in their retracted positions, as indicated in Fig. 3, when the coupler heads are disengaged. When either of said coupler heads is interlocked with a mating coupler, the spring wedge 16 or 16a, as the case may be, is driven in the reverse direction sufficiently to permit the pivoted locking lever to be released from its inoperative position. The lever may be moved freely in the direction of its length to cause its end to project over the top surface of the mating coupler arm, as indicated in Fig. 2. The said mating coupler arm is then held in its interlocked position by the pressure exerted downwardly on the arm through the lever by means of the wedge. It will be observed that the locking lever, being freely movable into and out of its locking position, avoids any lateral pressure against the mating coupler arm and also avoids any abrasive or rubbing engagement with the said arm regardless of height of the upper surface of the mating coupler with which it is engaged.

While the invention is illustrated in connection with a hose coupler of a specific construction illustrated in connection with certain specific embodiments, it will be understood that the invention is not restricted to the constructions shown and described except insofar as the claims are specifically limited.

I claim:

1. In combination, a hose coupler comprising a head formed for interlocking engagement with a mating coupler, a locking lever pivotally supported on a horizontal axis on the head and movable lengthwise to project over a portion of said mating coupler, and means for tilting the lever to force one end thereof downwardly into holding engagement with the mating coupler, comprising a vertically rigid one-piece wedge adapted to be driven between the other end of the lever and the head and having resilient end portions adapted to press laterally against portions of the head to hold the wedge in position.

2. In combination, a hose coupler comprising a head formed for interlocking engagement with a mating coupler, a locking lever pivotally supported on the head and movable lengthwise into a position overlying a portion of said mating coupler, and means for tilting the lever to force one end thereof downwardly into holding engagement with the mating coupler, comprising a one-piece wedge adapted to be driven between the other end of the lever and the head, a housing on the head for guiding the wedge; the said wedge being bifurcated to provide resilient end portions adapted to press laterally against the walls of said housing to hold the wedge against accidental forward and reverse movements.

3. In combination, a hose coupler comprising a head formed for interlocking engagement with a mating coupler, a locking lever pivotally supported on the head to rock in a vertical plane and movable in the direction of its length transversely of the head to overlie a portion of said mating coupler, and means for locking the said lever in its said overlying position or in its retracted position comprising a one-piece spring wedge which is rigid vertically but resilient laterally adapted to be driven between one end of the arm and the top portion of the coupler head and into lateral frictional engagement with a portion of said head, and a stop member positioned in the path of movement of the wedge to limit its forward and reverse movements.

4. In combination, a hose coupler comprising a head formed for interlocking engagement with a mating coupler, and means for locking the said coupler members in their interlocked relation comprising a lever pivotally supported on the coupler head and movable to a position overlying a portion of the mating coupler, a spring cotter wedge positioned for movement transversely of the lever and adapted to be driven between an end portion of the lever and the coupler head to move the other end of the lever into holding engagement with the mating coupler; the outer walls of said wedge member being recessed to increase the flexibility of the end portion, and means projecting into said recesses for limiting the forward and reverse movements of said wedge.

5. In combination, a hose coupler comprising a head formed for interlocking engagement with a mating coupler, a locking lever pivotally supported on the head in a position transversely of the head and adapted to be moved to a position overlying a portion of the mating coupler, and a spring cotter wedge movable lengthwise of the coupler head into binding engagement between one end of the lever and the said head, and a V-shaped member on the head positioned in the path of movement of the wedge to force the resilient end portions thereof outwardly, whereby the said end portions exert a spring-holding grip on the said V-shaped portion.

6. In combination, a hose coupler comprising a head and a forwardly projecting arm adapted to interlock, respectively, with the arm and head of a mating coupler and means for locking the coupler heads in said coupled relation by pressure exerted downwardly on the mating coupler arm, comprising a lever pivotally supported on a horizontal axis on the coupler head and slidable transversely of the head to a position overlying the mating coupler arm, and means for forcing the overlying end of the lever downwardly against the mating coupler arm comprising a vertically rigid spring cotter member adapted to flex laterally into frictional gripping engagement with portions of the head and formed on its top face with surfaces which incline both lengthwise and transversely of the cotter member to provide wedging faces for engagement with the under surface of one end of said lever, whereby movement of the wedge in one direction imparts tilting movement to the lever and the wedge has flat contact with the lever at any tilted position thereof, and means for limiting the forward and reverse movements of said wedge.

7. In combination, a hose coupler comprising a head and a forwardly projecting arm adapted to interlock, respectively, with the arm and head of a mating coupler, a locking lever pivotally supported on the head and adapted to be moved to overlie a portion of the mating coupler arm, a spring cotter wedge positioned for movement transversely of the lever and adapted to be driven between an end portion of the lever and the head of the first mentioned coupler to move the other end of the lever into holding engagement with the mating coupler arm, and means on said coupler head for guiding the movements of the spring cotter wedge, said guiding means including a V-shaped portion positioned in the path of movement of the wedge so as to spread the resilient ends of the wedge to effect spring holding pressure for resisting movement of the wedge in either forward or reverse direction.

8. In combination, a hose coupler comprising a head formed for interlocking engagement with a mating coupler, and means on said head for maintaining the coupler members in their interlocked relation comprising a locking lever pivoted adjacent one end on a horizontal axis to rock in a vertical plane extending transversely of the head and movable in the direction of its length on said pivotal axis to project over a portion of the mating coupler and means for forcing the lever into tight holding engagement with the mating coupler comprising a vertically rigid spring wedge having laterally flexible end portions adapted to be flexed outwardly from each other to effect binding engagement with part of the coupler head so as to resist forward or reverse movement, the wedge being adapted to be driven between one end of the lever and the top portion of the head on which the lever is supported to rock said lever into holding engagement with the mating coupler.

EDWARD A. RUSSELL.